T. S. MILLER.

MARINE CABLEWAY.

APPLICATION FILED FEB. 2, 1918.

Reissued May 18, 1920.

14,858.

4 SHEETS—SHEET 1.

WITNESSES:
Geo. C. Cheney

Thomas Spencer Miller INVENTOR.
BY Gifford & Bull
his ATTORNEYS

T. S. MILLER.

MARINE CABLEWAY.

APPLICATION FILED FEB. 2, 1918.

Reissued May 18, 1920.

14,858.

4 SHEETS—SHEET 2.

WITNESSES:
Geo. E. Cheney.

Thomas Spencer Miller INVENTOR.
BY Gifford & Bull
his ATTORNEYS

T. S. MILLER.
MARINE CABLEWAY.
APPLICATION FILED FEB. 2, 1918.
Reissued May 18, 1920.
14,858.
4 SHEETS—SHEET 3.
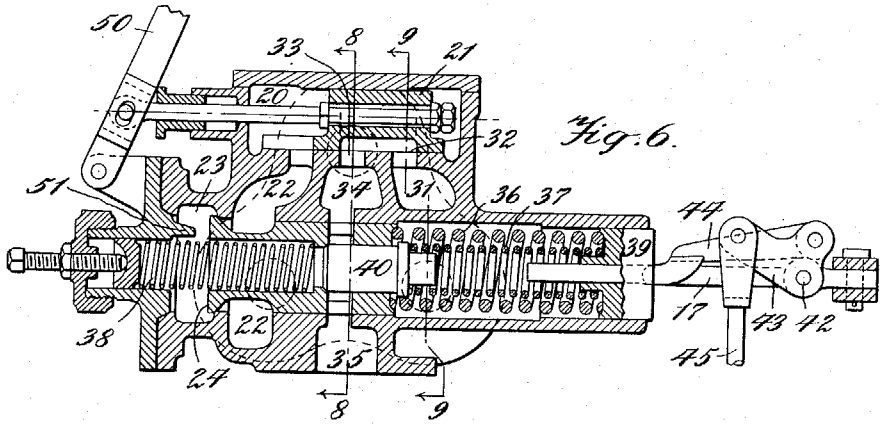
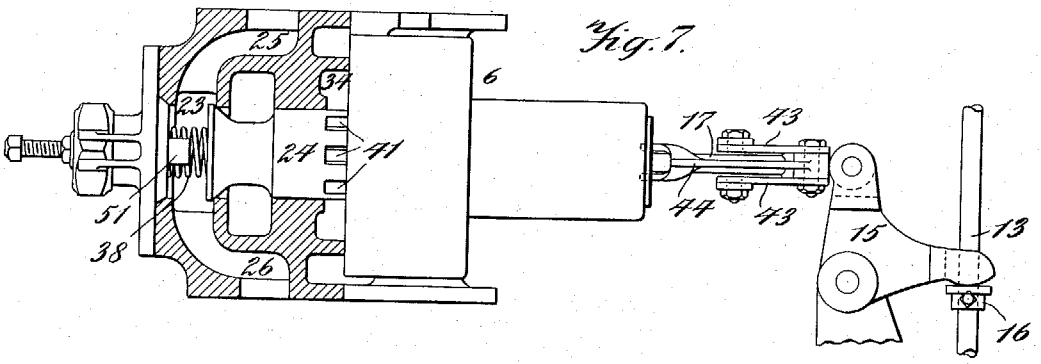
WITNESSES:
Geo. E. Ohney.
Thomas Spencer Miller INVENTOR.
BY Gifford & Bull
his ATTORNEYS

T. S. MILLER.

MARINE CABLEWAY.

APPLICATION FILED FEB. 2, 1918.

Reissued May 18, 1920.

14,858.

4 SHEETS—SHEET 4.

WITNESSES:
Geo. L. Cheney

Thomas Spencer Miller INVENTOR.
BY Gifford & Bull
his ATTORNEYS

UNITED STATES PATENT OFFICE.

THOMAS SPENCER MILLER, OF SOUTH ORANGE, NEW JERSEY.

MARINE CABLEWAY.

14,858. Specification of Reissued Letters Patent. Reissued May 18, 1920.

Original application filed May 5, 1908, Serial No. 430,991. Renewed January 27, 1910, Serial No. 540,470. Original No. 1,028,897, dated June 11, 1912. Application for reissue filed February 2, 1918. Serial No. 215,184.

*To all whom it may concern:*

Be it known that I, THOMAS SPENCER MILLER, a citizen of the United States, and a resident of South Orange, in the county of Essex and State of New Jersey, have invented certain new and useful Improvements in Marine Cableways, of which the following is a specification.

The present invention relates to certain novel and useful improvements in marine cableways, and in the present instance I have shown my improvements as a cableway stretched between two vessels.

The apparatus hereinafter described will be found particularly useful as a life-saving apparatus, when operating between a wreck and another or a rescuing vessel.

The invention consists in the construction, combination and arrangement of parts set forth in and falling within the scope of the appended claims.

Figure 1:
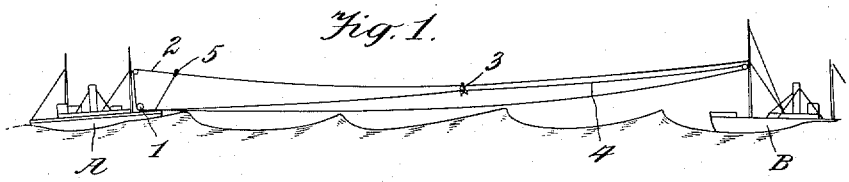
Figure 2:
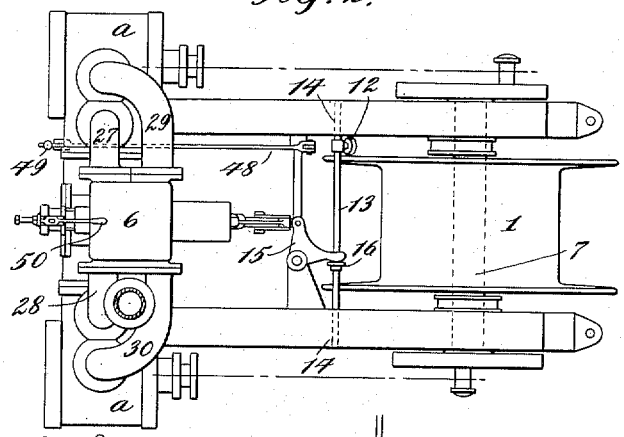
Figure 3:
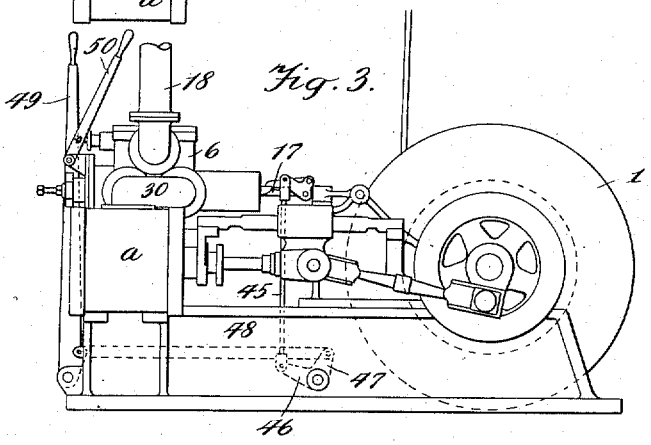
Figure 4:
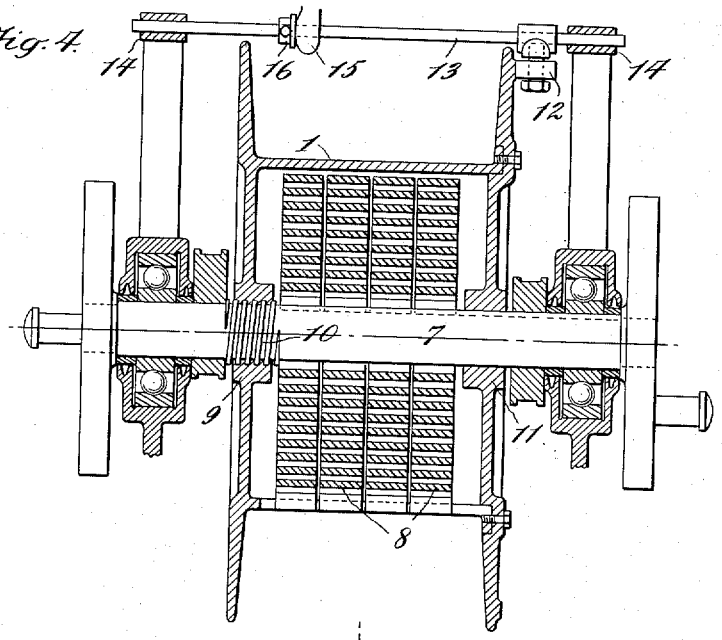
Figure 5:
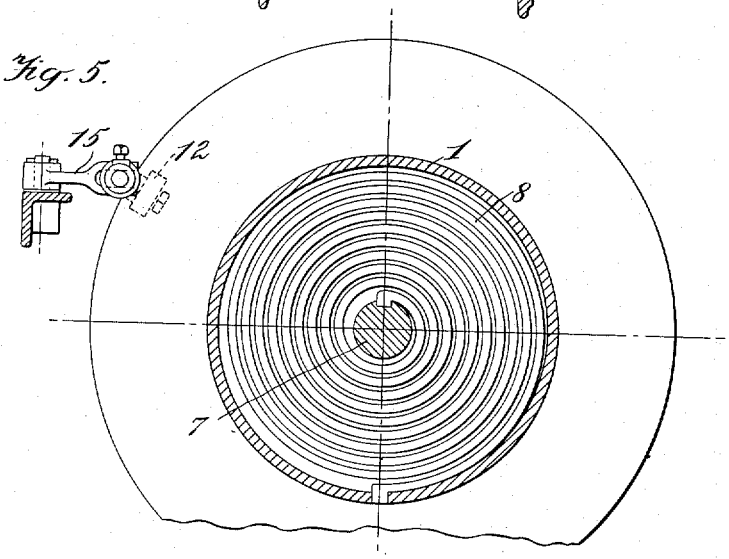
Figure 8:
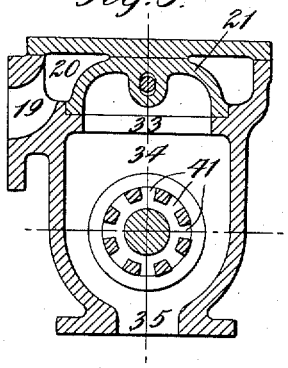
Figure 9:
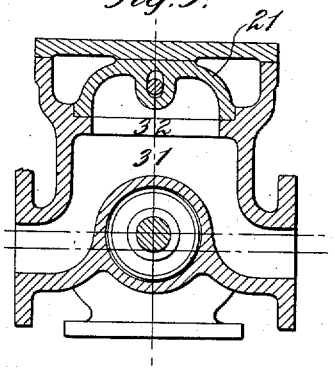
Figure 10:
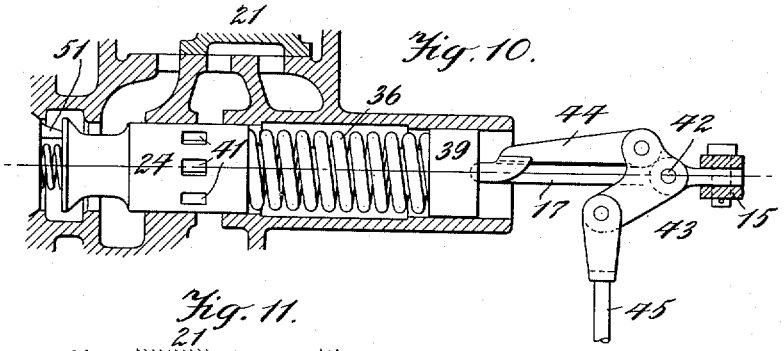
Figure 11:
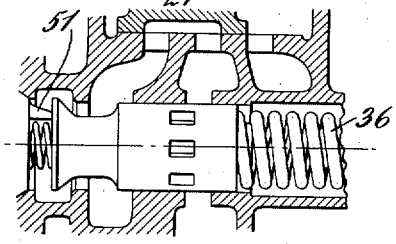

In referring now to the accompanying drawings in detail, Figure 1 is a view in elevation illustrating two vessels with my improved cableway in operation between the same; Fig. 2 is a top plan view of an improved automatic reel particularly adapted for use in connection with a cableway of the character referred to; Fig. 3 is a view of the same inside elevation; Fig. 4 is a horizontal sectional view taken through the drum of the reel; Fig. 5 is a vertical sectional view through the drum showing a side view of the spring within the barrel of the drum; Fig. 6 is a detail sectional view of an improved form of valve mechanism used in connection with my improved reel; Fig. 7 is a plan view partly in section of the same; Fig. 8 is a detail sectional view taken on the line 8—8 of Fig. 6; Fig. 9 is a similar view taken on the line 9—9 of Fig. 6; Figs. 10 and 11 are details.

In my Patent No. 777,685, dated December 20, 1904, I have shown a cableway designed for the transference of loads between two points, and in this patented construction is illustrated a carriage traveling to and fro, with means for maintaining the carriage at a normal load, during this operation, such means embodying, among other features, a mechanism whereby the yielding power of a fluid is applied in opposition to the strain on the cable and upon which the carriage travels. Also in my co-pending application Serial No. 392,115, dated September 10, 1907, I have shown a cableway wherein I employ an automatic reel comprising a multiple cylinder fluid engine with valve mechanism for controlling the admission of the operating fluid to the engine, and actuating such valves to vary the fluid pressure on the engine whereby to produce uniform torque at the drum and so obtain unform tension on the cable while it is paid out and wound in.

In the present instance I aim to provide an automatically operating reel wherein the steam pressure in the cylinders is automatically reduced when the tension upon the cable is increased, and whereby the steam pressure is automatically increased when the tension upon the main cable decreases, the result being that the reel automatically responds instantly to all variations of the main cable tension, and I am therefore enabled to pay out and take up the cable as demanded, and at the same time maintain the cable under a substantially constant tension, and therefore reduce the changes of deflection substantially to those incident to changes in length of span.

While in the present instance I have shown my improved apparatus as employed between two vessels, as life-saving apparatus, I wish it of course to be understood that it may be embodied in forms different from those herein shown and applied, and also to other uses without departing from the spirit of the invention and the scope of the claims.

I will, for the purpose of illustration, describe my invention as employed in connection with life-saving apparatus operating between two vessels.

In Fig. 1, A designates the rescuing vessel and B the wrecked vessel. Between these two vessels is stretched the main cableway 2, one end of which is wound around the automatic reel 1, located upon the vessel A, the cable then extending over a leading block at the mast-head to the mast of the vessel B. On the main cable runs an ordinary breeches buoy 3, which is conveyed from ship to ship by the endless rope 4 operated by life-savers located on the vessel A. Over the deck of the vessel on the main cable is a haul-down block 5, the purpose of which is to haul down the main cable to the deck when the passenger arrives. Inasmuch as the two vessels A and B are constantly tossed about in the sea, and approach and recede from each other, there is an alternate tightening and slackening of the main cable and if this be not avoided, the breeches buoy and its occupant are liable one instant to be submerged in the water, and the next to be tossed to a considerable elevation. I obviate this difficulty by employing the automatic reel which I will now describe in detail, the function of which reel may be briefly described as follows: It pays out and takes up the cable as demanded, maintains the main cable at a substantially constant tension, and therefore reduces the changes of deflection substantially to those incident to changes in length of span.

The automatic reel is shown in detail in Figs. 2 to 11 inclusive. In my preferred construction this reel comprises a double cylinder engine *a* on the crank shaft 7, of which is mounted the drum 1, on which the main cable is wound. In the operation of the cableway steam is in the cylinders all the time, hence, when the drum is stationary, the cable is maintained at its deflection by the steam, plus the friction of the mechanism, so that the tension in the main cable may increase an amount in proportion to this friction before the engine will be overhauled to pay out the rope as demanded. This will tend to affect the working of the cableway, and to compensate for this difficulty I provide means whereby the steam pressure in the cylinders is automatically reduced when the main cable tension is increased, and the steam pressure in the cylinders is likewise increased when the main cable tension decreases, so that the reel automatically responds instantly to all variations of the main cable tension. In order to effect this steam regulation I employ a novel form of valve 6, which is operated through certain mechanism by the axial movement of the drum 1 along the shaft, the movement in one direction corresponding to an increase of the main cable tension, producing a decrease in steam pressure, and the movement in the opposite direction corresponding to a decrease of the main cable tension, producing an increase in the steam pressure. The mechanism for accomplishing this may be briefly described as follows:

On the crank shaft 7, Figs. 4 and 5, are mounted several coil springs 8, the inner ends being keyed to the crank shaft 7 while the outer ends are secured to the drum 1. The hub 9 of the drum 1 is made with a female thread which works upon the male thread 10 on the crank shaft, the hub 11 being loose upon the shaft. This construction produces an axial movement of the drum to the left if the drum revolves in the direction to wind up the springs, and an axial movement to the right if it revolves so as to uncoil the springs. This axial movement is transmitted to the regulating valve 6, by the roller 12 bearing against the adjacent flange of the drum. The roller 12 is secured to the shaft 13 which latter is free to slide in the bearings 14. One arm of the bell-crank lever 15 bears against the collar 16 on the shaft 13, the other arm of the bell-crank 15 being connected to the operating rod 17 of the regulating valve 6, the hereinafter mentioned springs in the regulating valve tending to keep the roller 12 in contact with the drum flange. The construction of this regulating valve 6 is more clearly shown in detail in Figs. 6 to 11 inclusive. Steam from the boiler (not shown), enters at 19, through the pipe 18 to the steam chest 20, thence when the D-valve 21 is in the position shown in Fig. 6, the steam passes to the passage 22 and the chamber 23, the valve 24 being unseated as hereinafter described. From the chamber 23 the steam passes by way of the passages 25 and 26 and the pipes 27 and 28 to the cylinders *a*, *a*. The exhaust from the cylinders passes through the pipes 29 and 30 to the chamber 31, through the ports 32 and 33, by way of the D-valve 21 to the chamber 34 and finally out through the port 35 to the main exhaust. If the D-valve 21 be moved by the lever 50 to the position shown in Fig. 11, the steam will enter the cylinders by way of the pipes 29 and 30 and will exhaust through the pipes 27 and 28, thence through the valve 6 and out through the port 35 to the main exhaust, and in this position of the D-valve the engine reverses and runs in the opposite direction. The valve 24 is unseated to permit the passage of steam to the chamber 23 by means of the heavy springs 36 and 37, and when the pressure of the springs 36 and 37 is relieved, the relatively light spring 38 operates to seat the valve 24. This valve 24 operates to deliver steam to the engine at pressures varying from zero up to the steam line pressure. The operation of this valve is as follows: The piston valve 24 is unseated by the pressure of the springs 36 and 37, these springs being compressed by moving the piston 39 to the left, and the amount of compression is in proportion to the required pressure of the steam to be delivered. The steam expands into the chamber 23 and the engine cylinders, and would eventually become substantially the same as the steam line pressure if the valve 24 was held positively open, but as this valve is not held positively open, as soon as the pressure in the chamber 23 reaches the point determined by the compression of the springs 36 and 37, the total steam pressure acting on the effective area of the valve 24 just overbalances the spring pressure and the valve 24 seats and cuts off the flow of steam. Preferably, in the operation the valve 24 remains open just enough to allow sufficient steam to flow to supplant that consumed by the engine and to maintain the steam at the required pressure. The stop 51 is employed for limiting the opening of the valve 24.

In the operation of the cableway the reel is constantly being over-hauled by an increase of the main cable tension, and at such times the engine operates as a pump and the pressure in the chamber 23 will perhaps run up above that determined by the pressure of the springs 36 and 37. To relieve this added pressure a relief or puppet valve 40 is provided in the valve 24 seated by the smaller spring 37, so that when the pressure in the chamber 23 runs up, as mentioned, the valve 40 will be unseated and the steam blown off through the ports 41 into the chamber 34 and into the main exhaust.

In order to permit the operator to regulate the steam at will, I may employ the mechanism shown in the drawings in Figs. 2, 3, 6 and 7, which may be briefly described as follows: To the valve operating rod 17 is pivoted as at 42, the bell-crank lever 43, to the shorter arm of which is secured one end of the pusher 44 bifurcated at its opposite end. The two fingers of the pusher 44 straddle the rod 17 and fit into notches in the piston 39. To the long arm of the bell-crank 43 is pivoted the rod 45, and by means of this rod 45, the levers 46 and 47, and the rod 48, connection is made to the hand lever 49. When the hand lever 49 is pulled to the left, (Fig. 3) the bell-crank 43 and the pusher 44 will assume the positions shown in Fig. 10, the piston 39 being moved along the rod 17, and the springs 36 and 37 being compressed. This mechanism places the control of the steam in the hands of the operator without affecting the automatic steam regulation. That is to say, the operator controls the position of the piston 39 on the rod 17, and this effects the mean working pressure, but in doing so does not affect the automatic regulation caused by the movement of the drum 1. To facilitate the hauling down of the main cable to land the passenger the tension of the main cable may be reduced by the operator through the actuation of the lever 49.

In further explanation of the operation of the invention I will now describe the operation as it takes place under the different conditions in which the engine may be at the time the variation in tension on the cable takes place. When the engine is stationary the main cable is being held at its normal deflection, and, therefore, its normal tension, by the steam in the cylinders plus the friction of the engine mechanism. At this time the valve 24 is closed, or it may be that it is just sufficiently open to admit enough steam to the cylinders to supply that which may be lost by condensation in order to maintain the steam pressure constant. With the engine holding the main cable in this condition, should a decrease occur in the load on the cable, a spring drum will immediately act to take up the cable; that is to say, the drum will turn on the crank shaft owing to the yielding connection provided between the drum and said shaft, and this relative rotation of the drum on the shaft will act on the valve to admit more steam into the cylinders, and the engine will start forward winding up the rope on the drum until the deflection of the rope is normal. Suppose now an increase occurs in the load on the main cable; that is to say, the deflection becomes less than normal. The first effect of this will be to uncoil the rope from the drum and wind up the springs; that is to say, the drum will rotate on the shaft slightly and this action will serve to cause the closing of the valve 24, thus shutting off the steam from the cylinders. The increased tension in the main cable will continue to unwind the rope from the drum and may actually overhaul the drum or turn it backward. The effect of this would be much the same as a pump and the steam in the cylinders will be compressed. If there were no outlet for this steam, the time would come when the tension of the cable would balance the increase of steam pressure in the cylinders, and the cable would stand at an abnormally small deflection. For this reason the puppet valve 40 is provided, and the increased steam pressure acting on this valve tends to unseat it and the steam escapes into the main exhaust of the engine. When sufficient rope has been unwound from the drum to restore the main cable to its normal deflection, the steam pressure in the cylinders will be normal and will maintain the cable in its normal deflection.

I will now describe the operation of the invention should a change in the tension take place while the engine is running forward: When the engine is running forward it is coiling up the rope on the drum to bring the main cable to its normal deflection. If at this time a decrease should occur in the load the first effect will be that the springs in the drum will operate to turn the drum to take up a little rope; that it is to say, the drum will rotate with respect to the crank shaft and this will have the effect of opening the valve 24, thus increasing the speed of the engine. If, however, while the engine is running forward, an increase occurs in the load on the cable, the effect would be to bring the main cable up to the point of normal deflection or it might be that it would carry it beyond this point.

The effect of this would be to wind up the spring slightly, which in turn would seat the valve 24, cutting off the steam supplied to the cylinders, and, if at this time the deflection of the cable was normal the engine would remain stationary. If the deflection was less than normal the steam in the cylinders would blow off and the main cable would gradually settle down to normal deflection. The engine runs backward under steam only when paying out the rope for setting up the apparatus, and at this time the regulating valve does not come into action and it is, therefore, unnecessary to consider it. The spring or yielding connection between the drum and shaft serves as a detector of any increase or decerase in the load on the drum so that the controller for the drum-driving means will be operated to cause the drum to take up or let out the rope; that is, the spring or yielding connection is sensitive to the changes of load and, in that sense, detects such changes.

I am aware that my improved form of automatical reel, and the mechanism herein described coöperating with the same, may be employed for other purposes than in connection with marine cableways and therefore I do not wish to be understood as limiting myself to this particular use which, for the purpose of illustration, I have set forth.

What I claim and desire to secure by Letters Patent of the United States, is:—

1. In one of two cable connected vessels subject to wave action, the combination with a drum, of a fluid pressure operated engine therefor, a cable under tension actuated by said drum, and means automatically acting in accordance with the degree of tension of the cable for increasing the fluid pressure in the cylinder of the engine when the tension on the cable is reduced and for decreasing the fluid pressure in the engine cylinder when the tension on the cable increases.

2. In a cableway, the combination with a drum, of a fluid pressure operated engine therefor, a cable under tension actuated by said drum, and means for automatically increasing the fluid pressure in the cylinder of the engine when the tension of the cable is reduced and for automatically decreasing the fluid pressure in the engine cylinder when the tension of the cable increases.

3. In a cableway, the combination of an axially movable drum, a fluid pressure operated engine therefor, a valve mechanism actuated by the axial movement of the drum in one direction to admit an increase of fluid pressure to the engine, and actuated by the axial movement of the drum in the opposite direction to decrease the admission of fluid to the engine.

4. In one of two cable connected vessels subject to wave action, the combination of a drum, a cable under tension operated thereby, a fluid pressure operated engine for the drum, valve mechanism for automatically increasing the fluid pressure in the cylinder of the engine when the tension on the cable is reduced and automatically decreasing the fluid pressure in the engine cylinder when the tension on the cable is increased, and supplemental manually controlled mechanism for operating said valve mechanism.

5. A cableway including in combination a fluid pressure operated engine, a shaft, a winding drum mounted on and having axial movement along said shaft, a cable, valve mechanism for controlling the fluid pressure in the engine, and means operated by the axial movement of the drum for affecting said valve to produce an increase or decrease of steam pressure in the engine according to the direction of axial movement of the drum.

6. The combination with an engine, a drum therefor, tension means within said drum connecting the latter with a shaft, said drum having axial movement upon said shaft, and valve mechanism for the engine actuated by the axial movement of said drum.

7. In a cableway, the combination of an axially movable drum, a fluid-operated engine controlling said drum, a cable under tension wound upon the drum, said drum having axial movement dependent upon the tension of the cable, a valve for controlling the flow of power fluid to the engine, and means actuated in accordance with the lateral movement of the drum for controlling said valve.

8. In a cableway, the combination of a revoluble element, a drum mounted thereon and movable axially thereof, said drum being mounted for a revoluble movement on the said element independent of the revolution of the latter, a yielding connection between said drum and element, a cable under tension wound upon the drum, said drum having its axial movement dependent upon the tension of the cable, a valve for controlling the flow of power fluid to the engine, and means actuated by the lateral movement of the drum for controlling said valve.

9. In a cableway, the combination of a cable, a revoluble drum upon which the cable is wound, said drum having a movement besides that of revolution, said additional movement being dependent in degree upon the tension of the cable, means for revolving the drum, and means controlled by the degree of the additional movement for controlling the drum-revolving means.

10. In a cableway, the combination of a cable, a revoluble drum upon which the cable is wound, said drum having a movement in addition to that of revolution, said additional movement being dependent in degree upon the tension of the cable, a fluid pressure motor for revolving the drum, a valve for controlling the flow of fluid pressure to the motor, and means acting in accordance with said additional movement of the drum for controlling said valve.

11. In a cableway, the combination of a cable, a revoluble drum upon which the cable is wound, a shaft for driving the drum and upon which the latter is mounted, a threaded connection between the drum and shaft whereby the drum is axially movable, a fluid-pressure motor for driving said shaft, a valve for controlling the flow of fluid pressure to the motor, and means acting in accordance with the axial movement of the drum for controlling said valve.

12. In a cableway, the combination of a cable under tension, a winding mechanism for the cable including a shaft, an axially movably element on said shaft movable according to the tension of the cable, a motor for driving the shaft, and controlling means for the motor acting automatically in accordance with the movements of the axially movable element.

13. In a cableway, the combination of a drum, a cable under tension wound thereon, a shaft upon which the drum is mounted, means for rotating the shaft in opposition to the revolution of the drum caused by the pull on the cable, a connection between the shaft and drum permitting a relative revoluble movement between them, means for causing a relative axial movement between the drum and shaft according to the tension of the cable, and means acting in accordance with the degree of relative axial movement for controlling the shaft-rotating means.

14. In a cableway, the combination of a cable under tension, a winding mechanism for the cable including a shaft, an element movable axially of the shaft according to the tension of the cable, a motor for driving the shaft, and controlling means for the motor acting automatically in accordance with the movements of said element.

15. In one of two cable connected vessels subject to wave action, the combination of a cable under tension, winding mechanism for the cable including a driven element, a motor for driving said element, controlling means for the power operating the motor, a movable element engaged by the cable and movable according to the varying tension thereof, and mechanism for transmitting motion from the movable element to the controlling means for the power operating the motor, whereby the controlling means is operated to decrease or increase the power operating said motor according to the changes of tension of the cable.

16. In a cableway, the combination of a cable under tension, winding mechanism for the cable including a driven member, a motor for driving said member, an element movable relative to the driven member according to the degree of tension of the cable, a resilient connection between the said element and the driven member subjected to the pull of the cable for determining the extent of relative movement between said element and driven member, and controlling means for the motor actuated automatically according to the degree of relative movement between said member and element.

17. In a cableway, the combination of a cable under tension, winding mechanism for the cable including a driven member, a motor for driving said member, an element movable relative to the driven member according to the degree of tension of the cable, means between said element and the driven member subjected to the pull of the cable, for determining the extent of relative movement between said element and driven member, and controlling means for the motor actuated automatically according to the degree of relative movement between said member and element.

18. In a cableway, the combination of a cable under tension, winding mechanism for the cable including a driven member, a motor for driving said member, an element movable relative to the driven member according to the degree of tension of the cable, a spring connecting said element and the driven member subjected to the pull of the cable for detecting variations of tension in the cable, and controlling means for the motor acting automatically in accordance with the changes of tension as detected by said spring.

19. In a cableway, the combination of a cable under tension, a winding drum upon which the cable is wound, means for driving the drum, a controller for said driving means, a spring acted upon by the drum to detect changes of load on the drum caused by variation of tension in the cable, and a connection between the spring and the controller for operating the latter.

20. In a cableway, the combination of a cable under tension, a winding mechanism for the cable including a shaft, an element movable axially of the shaft according to the tension of the cable, and controlling means for the shaft acting automatically in accordance with the movements of said element.

21. In a cableway, in combination, a cable under tension, a shaft, a drum mounted on the shaft and upon which the cable is wound, a spring connecting the drum and shaft whereby the drum may move independently of the shaft under variations of load caused by changes of tension in the cable, and means controlled by the drum for governing said shaft in accordance with the variations of load on the drum.

22. In a cableway, the combination of relatively movable supports, a cable stretched between the supports, a winding mechanism for the cable including a driving shaft, a drum mounted on the shaft upon which the cable is wound, means connecting the drum and shaft for detecting changes in the load on the drum caused by variations of pull on the cable, a controller for the shaft, and means whereby said controller acts automatically in accordance with the changes of load ascertained by said detector.

23. In a cableway, the combination of relatively movable supports, a cable stretched between the supports, a prime mover, a drum driven by the prime mover and upon which the cable is wound, means for controlling the prime mover, means acted upon by the drum for detecting changes of load on the drum caused by variations of pull on the cable, and means whereby said controller is operated from said detecting means.

24. In combination, a motor, a controller for the motor, a drum, a drum-driving member driven by the motor, a yielding connection between the drum and said driving member permitting independent movement of the drum relative to the drum-driving member in accordance with variations of load on the drum, and a connection between the drum and the controller for operating the latter in accordance with such variations of load.

25. In combination, a shaft, a hollow drum on the shaft, a detector located within the drum for detecting the load on the drum, a controller for the shaft and connections between the detector and said controller for operating the latter in accordance with variations of load on the drum.

26. In combination, a shaft, a drum mounted on the shaft, a spring connecting the drum and shaft whereby the drum may move independently of the shaft under variations of load, and means controlled by the drum for governing said shaft in accordance with variations of load on the drum.

27. In combination, a shaft, a drum driven by the shaft, a yielding connection between the drum and shaft whereby the drum may move independently of the shaft under variations of load on the drum, and means controlled by the independent movement of the drum for governing said shaft in accordance with said variations of load.

28. In combination, a shaft, a drum driven by the shaft, a spring connecting the drum and shaft whereby the drum may move independently of the shaft under variations of load on the drum, and means controlled by the independent movement of the drum for governing said shaft in accordance with said variations of load.

29. In combination, a drum, means for driving the drum, a controller for the driving means, a spring acted upon by the drum to detect changes of load on the drum, and a connection between the spring and the controller for operating the controller.

30. In combination, an engine, a throttle valve for the engine, a rope drum, a yielding connection between the drum and the engine, and a connection whereby the throttle is moved in accord with variations of the yielding connection.

31. In combination, a drum, a motor, a controller for the motor, a driving member for the drum, a driving connection between the drum and driving member permitting relative rotary movement between the same due to changes of load on the drum, said controller being operated in accordance with said relative movement.

32. In combination, a shaft, a motor for the same, a drum mounted on the shaft, a connection between the drum and shaft whereby the drum may rotate independently of the shaft under variations of load on the drum, and means acting in accordance with such independent rotation of the drum for controlling the motor for the shaft.

33. In combination, a shaft, driving means therefor, a drum mounted on the shaft, a spring connecting the drum and shaft whereby the drum may move independently of the shaft under variations of load, and controlling means for the shaft-driving means acting in accordance with the independent movement of the drum relative to the shaft.

34. In combination, a drum, a shaft upon which the drum is mounted, a connection between the drum and shaft permitting rotation of the drum independently of the shaft, means whereby the independent rotation of the drum causes the same to move longitudinally of the shaft, and a controller for the shaft operated by the drum in its movement longitudinally of the shaft.

35. In combination, a drum, a shaft upon which the drum is mounted, a spring connecting the drum and shaft whereby the drum may rotate independently of the shaft, means whereby the independent rotation of the drum causes the same to move longitudinally of the shaft, and a controller for the shaft operated by the drum in its movement longitudinally of the shaft.

36. In combination, a drum, a shaft upon which the drum is mounted, a connection between the drum and shaft whereby the drum may rotate independently of the shaft, a threaded connection between the drum and shaft whereby the independent rotation of the drum causes the same to move longitudinally of the shaft, and a controller for the shaft operated by the drum in its movement longitudinally of the shaft.

37. In combination, a drum, a shaft upon which the drum is mounted, a spring connecting the drum and shaft whereby the drum may rotate independently of the shaft, a threaded connection between the drum and shaft whereby the independent rotation of the drum causes the same to move longitudinally of the shaft, and a controller for the shaft operated by the drum in its movement longitudinally of the shaft.

38. In combination, a shaft, a motor for the same, a drum driven by the shaft, a yielding connection between the drum and shaft whereby the drum may rotate independently of the shaft under variations of load on the drum, and means acting in accordance with such independence of rotation of the drum for controlling the motor for the shaft.

39. In combination, a shaft, a motor for the shaft, a drum mounted on the shaft, a spring connecting the drum and shaft and permitting revolution of the drum in both directions independent of the shaft, and a controller for the motor operated by the drum in accordance with such independent revolution.

40. In combination, a vessel subjected to wave action, a drum thereon, a fluid pressure operated engine therefor, a cable under tension actuated by said drum and extending therefrom over the waves to a distant point, and means automatically acting in accordance with the degree of tension of the cable for increasing the fluid pressure of the engine when the tension on the cable is reduced, and for decreasing the fluid pressure of the engine when the tension on the cable increases.

In testimony whereof I have hereunto signed my name in the presence of two subscribing witnesses.

THOMAS SPENCER MILLER.

Witnesses:

ERNEST PULSFORD,
JOHN SINCLAIR.